United States Patent [19]
Meadows

[11] Patent Number: 6,088,305
[45] Date of Patent: Jul. 11, 2000

[54] FRAME ASSEMBLY FOR DATA STORAGE AND RETRIEVAL SYSTEM

[75] Inventor: John W. Meadows, Los Altos Hills, Calif.

[73] Assignee: DISC, Incorporated, Milpitas, Calif.

[21] Appl. No.: 08/229,278

[22] Filed: Apr. 18, 1994

[51] Int. Cl.[7] .......................... G11B 17/22; G11B 15/675
[52] U.S. Cl. ................................ 369/36; 360/92
[58] Field of Search .................. 369/75.1, 75.2, 369/34, 36; 220/510, 552; 217/21, 22, 30, 31, 32, 33; 229/120.02, 120.25, 120.26; 312/264, 265; 211/135, 186, 187

[56] References Cited

U.S. PATENT DOCUMENTS

| | | | |
|---|---|---|---|
| 3,120,413 | 2/1964 | Scotti | 217/31 |
| 3,139,559 | 6/1964 | Heidler | 312/265 |
| 3,837,560 | 9/1974 | Kuchuris et al. | 220/510 |
| 4,560,257 | 12/1985 | Otema | 312/265 |
| 4,754,397 | 6/1988 | Varaiya et al. | 369/34 |
| 5,040,161 | 8/1991 | Jones et al. | 369/75.1 |
| 5,128,912 | 7/1992 | Hug et al. | 369/36 |
| 5,206,845 | 4/1993 | Baxter et al. | 369/34 |

*Primary Examiner*—Jefferson Evans
*Attorney, Agent, or Firm*—Flehr Hohbach Test Albritton & Herbert LLP

[57] ABSTRACT

Frame assembly for a data storage and retrieval system of the type in which data storage cartridges are transported between storage locations and drive locations where data is written to and read from the cartridges. The frame includes a backplane which has a generally planar front surface, a plurality of spaced apart divider plates projecting in a forward direction from the front surface of the backplane, and a plurality of crossbars extending across the front portions of the divider plates and defining with the divider plates a plurality of cartridge cells and drive locations. Guide blocks which define slots for the cartridges project in the forward direction from the front surface of the backplane adjacent to the crossbars on opposite sides of the cartridge cells. Bezel strips extend along the front portions of the crossbars and interfit with the crossbars and the guide blocks, and bezel plates extend across the drive locations and interfit with the crossbars on opposite sides of the drive locations. The assembly is held together by screws which extend between the bezel strips and bezel plates and the backplane.

14 Claims, 4 Drawing Sheets

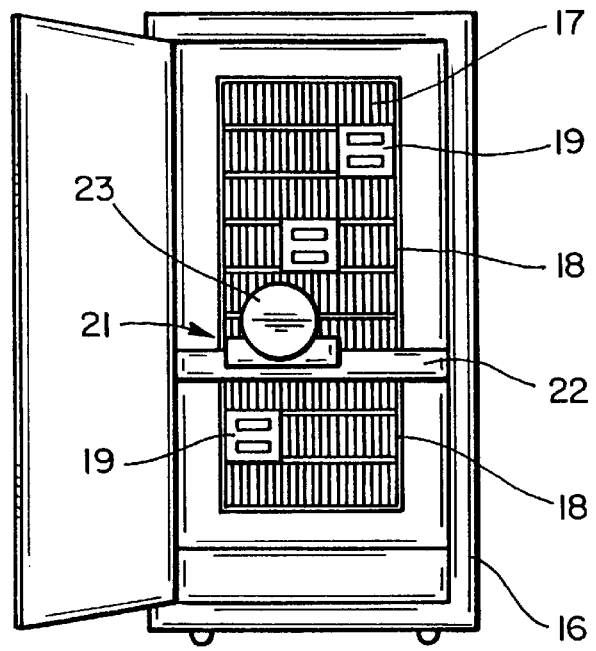
FIG_1
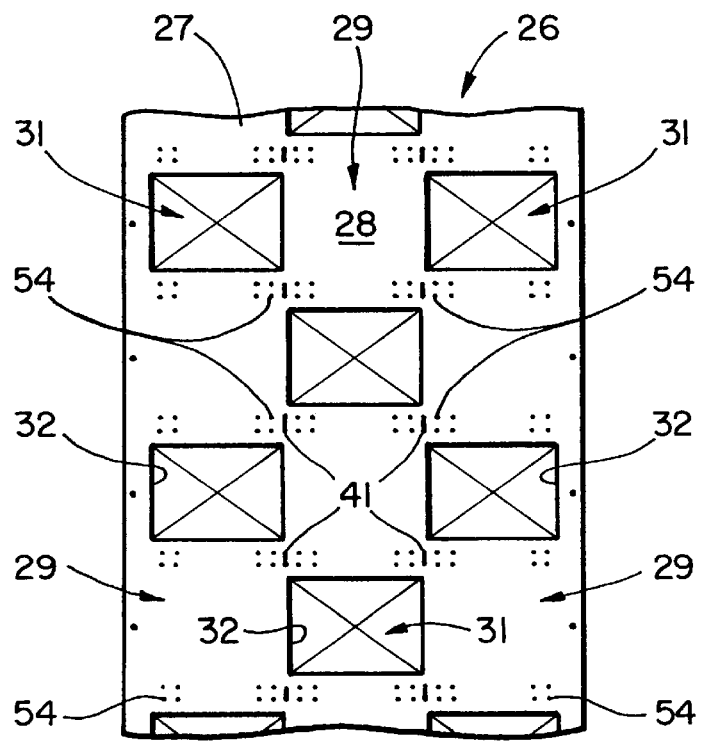
FIG_3

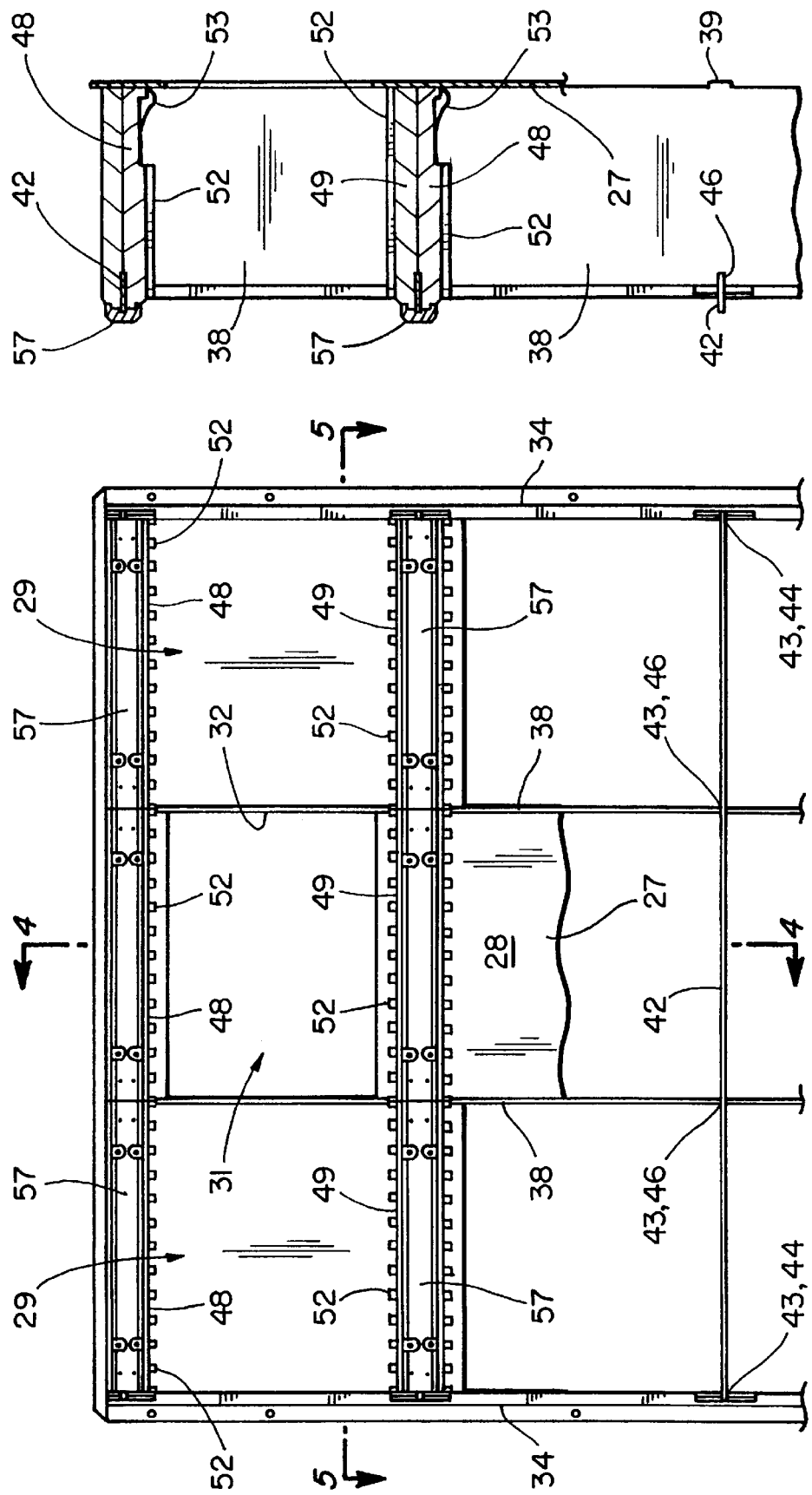

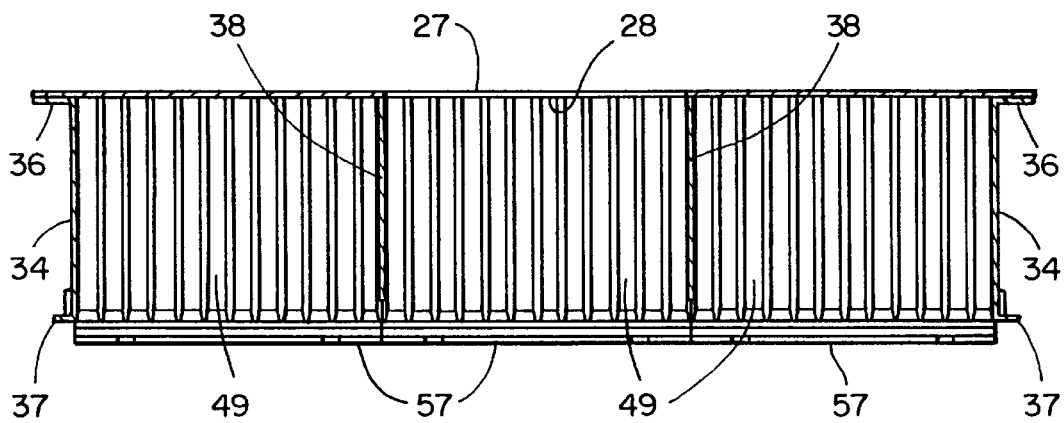
FIG_5
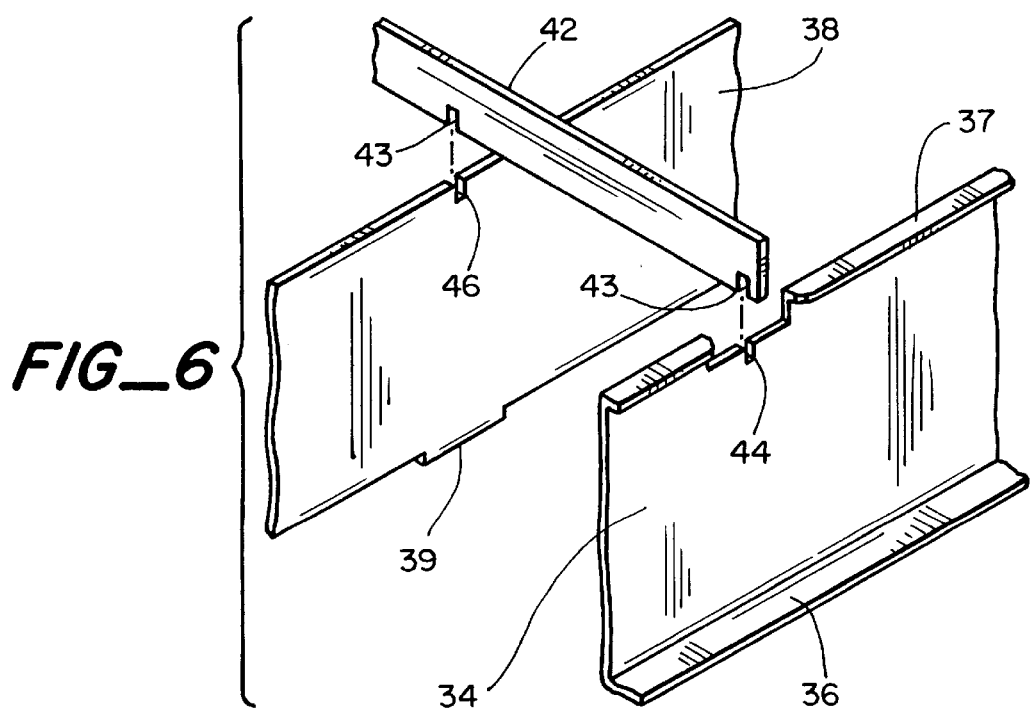
FIG_6

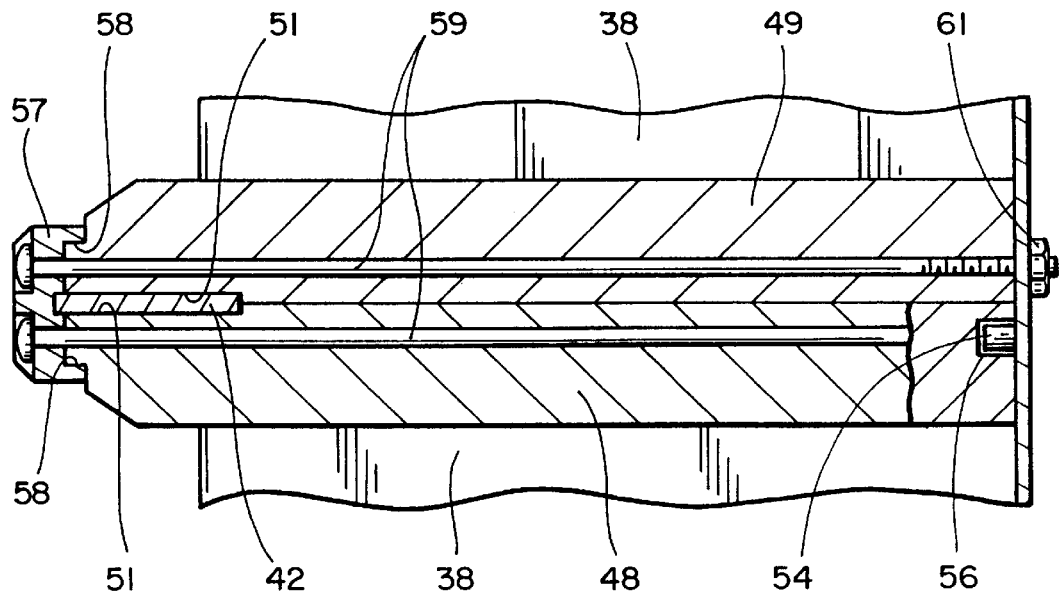
FIG_7
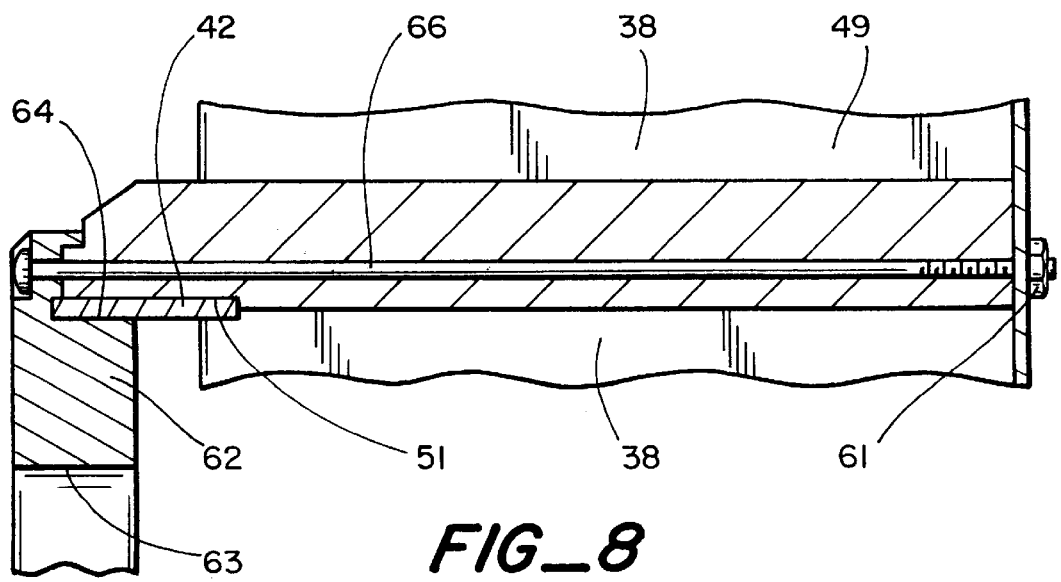
FIG_8

FRAME ASSEMBLY FOR DATA STORAGE AND RETRIEVAL SYSTEM

This invention pertains generally to information storage and retrieval systems and, more particularly, to a frame assembly for a data storage and retrieval system.

Optical storage systems have found increasingly wide use in recent years, particularly where relatively large amounts of data are to be stored and retrieved. The media which are most commonly employed in such systems at the present time are 5-¼ inch optical discs and CD-ROMs which are somewhat smaller in diameter. In both cases, data is stored in optically readable form on a disc which is enclosed within a protective case. Such media are sometimes referred to hereinafter generically as data storage cartridges. Unless indicated otherwise, that term is also intended to include magnetic tape cartridges and all other types of media employed in the storage of data.

To increase the amount of information which is available, data storage cartridges are sometimes arranged in groups or "libraries" with means for selectively transferring the cartridges between storage locations and one or more transcribing units where data is written to or read from the cartridges. Such systems are sometimes referred to as "juke boxes" because of their similarity to machines of that name for playing phonograph records, and one example of such a system is found in U.S. Pat. No. 5,206,845. That system is constructed in a modular form and can be readily configured to accommodate any desired number of cartridges and drives.

It is in general an object of the invention to provide a new and improved frame assembly for a data storage and retrieval system.

Another object of the invention is to provide a frame assembly of the above character which overcomes the limitations and disadvantages of the prior art.

These and other objects are achieved in accordance with the invention by providing a frame assembly having a backplane with a generally planar front surface, a plurality of spaced apart divider plates projecting in a forward direction from the front surface of the backplane, and a plurality of crossbars extending across the front portions of the divider plates and defining with the divider plates a plurality of cartridge cells and drive locations. Guide blocks which define slots for the cartridges project in the forward direction from the front surface of the backplane adjacent to the crossbars on opposite sides of the cartridge cells. Bezel strips extend along the front portions of the crossbars and interfit with the crossbars and the guide blocks, and bezel plates extend across the drive locations and interfit with the crossbars on opposite sides of the drive locations. The assembly is held together by screws which extend between the bezel strips and bezel plates and the backplane.

FIG. 1 is front elevational view of one embodiment of a data storage and retrieval system with a frame assembly according to the invention.

FIG. 2 is an fragmentary front elevational view, partly broken away of the frame assembly in the embodiment of FIG. 1.

FIG. 3 is a fragmentary front elevational view of the backplane in the embodiment of FIG. 1.

FIG. 4 is a cross-sectional view taken along line 4—4 in FIG. 2.

FIG. 5 is a cross-sectional view taken along line 5—5 in FIG. 2.

FIG. 6 is an exploded isometric view of a portion of the frame assembly in the embodiment of FIG. 1.

FIGS. 7 and 8 are enlarged vertical sectional views illustrating the manner in which the frame assembly is held together.

As illustrated in FIG. 1, the system includes a generally rectangular cabinet 16 in which a plurality of data storage cartridges 17 are stored in horizontally extending rows 18. Drive units 19 are included in some of the rows for writing data to and/or reading data from the cartridges. A picker assembly 21 transports the data cartridges between the storage locations and the drives under the control of a computer (not shown). The picker assembly includes a horizontally extending bridge 22 which moves up and down between the different rows, and a picker head 23 which moves back and forth across the bridge. The picker head includes a mechanism for removing a cartridge from a storage location or a drive, rotating the cartridge if necessary to the proper orientation for a destination drive or location, and inserting the cartridge into the destination drive or location.

The cartridge and drive locations are defined by a frame assembly 26 which includes a backplane 27. The backplane is a rigid rectangular plate fabricated of a material such as steel, and stands vertically within the cabinet. The backplane has a planar front surface 28, and in the embodiment illustrated in FIG. 1, there are nine rows of cartridge cell and drive locations. In this particular embodiment, there are three locations in each row, with every other row having two cell locations 29 and one drive location 31, and the intermediate rows having one cell location and two drive locations. The drive locations differ from the cell locations in that they include rectangular openings 32 through which the drives, which are generally deeper than the cartridges, can extend. Either drives or cartridge cells can be mounted in the drive locations, but drives generally cannot be mounted in the cell locations.

Side frames 34 extend vertically along the lateral margins of the backplane, with inner flanges 36 bolted to the front surface of the backplane and outer flanges 37 spaced from and parallel to the backplane. A pair of divider plates 38 extend vertically between the side frames and project in a forward direction from the front surface of the backplane. The divider plates have rearwardly projecting alignment tabs 39 which are received in slots 41 in the backplane to retain the rear portions of the divider plates in position on the backplane, with the plates in parallel alignment with the side frames.

Crossbars 42 extend horizontally between the side frames and interlock with the front portions of the side frames and the divider plates to form a gridwork which defines the locations for the cartridge cells and drives. The crossbars have a width on the order of one inch, a thickness on the order of ⅛ inch, and are oriented in a flat position with their width extending horizontally. Notches 43 in the rear edges of the crossbars interfit with notches 44, 46 in the front portions of the side frames and the divider plates to hold those parts together in "egg crate" fashion.

In each of the cartridge cell locations, a pair of guide blocks 48, 49 define a plurality of vertically extending slots for receiving the cartridges. The guide blocks are located on the upper and lower sides of the cells and extend between the front surface of the backplane and the crossbars. The blocks in adjacent rows are positioned back-to-back, with notches 51 in the outer portions of the back sides of the blocks to fit around the crossbars. The blocks have a plurality of spaced apart ribs 52 which define the slots for the cartridges, and the upper blocks have resilient fingers 53 which bear against the upper edges of the cartridges to hold them in the slots.

Alignment pins 54 project from the front surface of the backplane and are received in sockets 56 in the inner edges of the guide blocks to retain the blocks in the proper position on the backplane.

The outer portions of the guide blocks extend almost to the front edges of the crossbars, and bezel strips 57 interfit with the crossbars and the outer portions of the blocks to hold them together. The bezel strips extend lengthwise of the crossbars and have a curved front surface which provides a finished appearance. The back sides of the bezel strips are formed with slots 58 in which the outer portions of the mounting blocks and the crossbars are received. Mounting screws 59 extend through the bezel strips and guide blocks and are threaded into nuts 61 affixed to the rear side of the backplane to complete the assembly and hold the parts together rigidly.

In the drive locations, bezel plates 62 are mounted between the crossbars, with openings 63 for the drives. In the particular embodiment illustrated, the media is CD-ROMs, and two half-height drives are mounted in each drive location. However, any desired number of drives which will fit in the space available at the drive locations can be utilized.

The upper and lower edge portions of the bezel plates have a contour which matches the contour of the bezel strips, and the back sides of the bezel plates have slots 64 in which the crossbars and the outer portions of the mounting blocks in adjacent cells are received. Mounting screws 66, similar to screws 59, extend through the bezel plates and guide blocks to the nuts 61 on the backplane to hold the assembly together.

Although the invention has been disclosed in connection with a system in which the cartridges are stored vertically and the bridge for the picker assembly extends horizontally, it is not limited to that particular type of system. It is equally applicable, for example, to a system in which the cartridges are stored in a horizontal position. Such a system could be particularly with one-sided media such as CD-ROMs which would not have to be rotated when being transferred between storage locations and drive units, and that would permit the use of a somewhat simpler picker mechanism. In a system where the cartridges are stored horizontally, the frame assembly would be rotated 90 degrees, with divider plates 38 running horizontally, crossbars 42 running vertically, guide blocks 48, 49 mounted on the sides of the cell locations, and the mounting slots 51 on the drive bezels running vertically. With the cartridges stored in a horizontal position, it would also be possible to make the drive cells any desired height and to use a greater number of drives since the cells would no longer be limited in height by the width of the cartridges.

It would also be possible to have the bridge extend in a vertical direction and move horizontally or laterally, with the picker head moving vertically on the bridge. This arrangement would be particularly advantageous in a system in which more than one picker head is employed.

The invention has a number of important features and advantages. It is flexible in that drive units can be mounted in any or all of the drive locations, and cartridge cells can be placed in any remaining drive locations as well as in the cell locations. The assembly is easy to put together and take apart since the screws which hold it together are accessible from the front. Moreover, the drive units are mounted on the crossbars, and the bars provide an accurate reference for both the drive units and the cartridge cell locations. The assembly is quite rigid, and the accurate positioning of the drive units and cartridges assures proper picker action in transferring the cartridges between the various locations.

It is apparent from the foregoing that a new and improved frame assembly for a data storage and retrieval system has been provided. While only one presently preferred embodiment has been described in detail, as will be apparent to those familiar with the art, certain changes and modifications can be made without departing from the scope of the invention as defined by the following claims.

What is claimed is:

1. In a frame assembly for a data storage and retrieval system having a plurality of cartridges on which data is stored and at least one drive for transcribing data on the cartridges: a backplane having a generally planar front surface, a plurality of spaced apart divider plates projecting in a forward direction from the front surface of the backplane, a plurality of crossbars extending across the front portions of the divider plates and defining with the divider plates a plurality of cartridge cells and drive locations, the crossbars extending in front of the divider plates, guide blocks defining slots for the cartridges projecting in the forward direction from the front surface of the backplane adjacent to the crossbars on opposite sides of the cartridge cells, bezel strips extending along the front portions of the crossbars and having slots in the rear sides thereof in which the front portions of the crossbars and the guide blocks are received, a bezel plate extending across one of the drive locations and having slots in the rear side thereof in which the front portions of crossbars on opposite sides of the drive location are received, and screws extending from the bezel strips and plate to the backplane for holding the assembly together.

2. The frame assembly of claim 1 including registration means on the backplane and the divider plates for locating the divider plates in predetermined positions on the backplane.

3. The frame assembly of claim 2 wherein the registration means comprises slotted openings in the backplane and rearwardly projecting tabs on the divider plates which are received in the slotted openings.

4. The frame assembly of claim 1 including registration means on the backplane and the guide blocks for locating the guide blocks in predetermined positions on the backplane.

5. The frame assembly of claim 4 wherein the registration means comprises alignment pins and sockets in which the alignment pins are received.

6. The frame assembly of claim 1 wherein the front portions of the divider plates and the rear portions of the crossbars have interlocking notches which hold the crossbars in predetermined positions relative to the divider plates.

7. In a frame assembly for a data storage and retrieval system having a plurality of cartridges on which data is stored and at least one drive for transcribing data on the cartridges: a backplane having a generally planar front surface, a plurality of spaced apart divider plates projecting in a forward direction from the front surface of the backplane, a plurality of crossbars extending across the front portions of the divider plates and defining with the divider plates a plurality of cartridge cells and drive locations, guide blocks defining slots for the cartridges projecting in the forward direction from the front surface of the backplane adjacent to the crossbars on opposite sides of the cartridge cells, bezel strips extending along the front portions of the crossbars and interfitting with the front portions of the crossbars and the guide blocks, and screws extending between the bezel strips and the backplane for holding the assembly together.

8. The frame assembly of claim 7 including slotted openings in the backplane and rearwardly projecting tabs on the divider plates for locating the divider plates in predetermined positions on the backplane.

9. The frame assembly of claim 7 including alignment pins and sockets on the backplane and the guide blocks for locating the guide blocks in predetermined positions on the backplane.

10. The frame assembly of claim 7 wherein the front portions of the divider plates and the rear portions of the crossbars have interlocking notches which hold the crossbars in predetermined positions relative to the divider plates.

11. In a frame assembly for a data storage and retrieval system having a plurality of cartridges on which data is stored and at least one drive for transcribing data on the cartridges: a backplane having a generally planar front surface, a plurality of spaced apart divider plates projecting in a forward direction from the front surface of the backplane, a plurality of crossbars extending across the front portions of the divider plates and defining with the divider plates a plurality of cartridge cells and drive locations, means defining slots for receiving the cartridges in the cartridge cells, a bezel plate extending across one of the drive locations and interfitting with the front portions of the crossbars on opposite sides of the drive location, and screws extending between the bezel plate and the backplane for holding the assembly together.

12. The frame assembly of claim 11 including slotted openings in the backplane and rearwardly projecting tabs on the divider plates for locating the divider plates in predetermined positions on the backplane.

13. The frame assembly of claim 11 wherein the front portions of the divider plates and the rear portions of the crossbars have interlocking notches which hold the crossbars in predetermined positions relative to the divider plates.

14. The frame assembly of claim 11 wherein the bezel plate has slots on the rear side thereof in which the front portions of the crossbars are received.

* * * * *